US012245014B2

(12) United States Patent
Keiler et al.

(10) Patent No.: US 12,245,014 B2
(45) **Date of Patent: *Mar. 4, 2025**

(54) METHOD FOR AND APPARATUS FOR DECODING/RENDERING AN AMBISONICS AUDIO SOUNDFIELD REPRESENTATION FOR AUDIO PLAYBACK USING 2D SETUPS

(71) Applicant: Dolby Laboratories Licensing Corporation, San Francisco, CA (US)

(72) Inventors: Florian Keiler, Hannover (DE); Johannes Boehm, Göttingen (DE)

(73) Assignee: Dolby Laboratories Licensing Corporation, San Francisco, CA (US)

( * ) Notice: Subject to any disclaimer, the term of this patent is extended or adjusted under 35 U.S.C. 154(b) by 0 days.

This patent is subject to a terminal disclaimer.

(21) Appl. No.: 18/457,030

(22) Filed: Aug. 28, 2023

(65) Prior Publication Data

US 2024/0056755 A1 Feb. 15, 2024

Related U.S. Application Data

(60) Continuation of application No. 17/893,729, filed on Aug. 23, 2022, now Pat. No. 11,770,667, which is a (Continued)

(30) Foreign Application Priority Data

Oct. 23, 2013 (EP) .................................... 13290255

(51) Int. Cl.
*H04S 3/02* (2006.01)
*H04R 5/00* (2006.01)
(Continued)

(52) U.S. Cl.
CPC ................ *H04S 3/02* (2013.01); *H04S 7/308* (2013.01); *H04S 2400/11* (2013.01); *H04S 2420/07* (2013.01); *H04S 2420/11* (2013.01)

(58) Field of Classification Search
CPC .. H04S 5/005; H04S 2400/11; H04S 2420/11; H04S 2400/03; G10L 19/008
(Continued)

(56) References Cited

U.S. PATENT DOCUMENTS 5,594,800 A 1/1997 Gerzon
6,798,889 B1 9/2004 Dicker
(Continued)

FOREIGN PATENT DOCUMENTS

CN 1901761 A 1/2007
CN 101223575 B 7/2008
(Continued)

OTHER PUBLICATIONS

Boehm, J., "Decoding for 3D", Audio Engineering Society, Convention Paper 8426, 130th Convention, London, United Kingdom, May 13, 2011, pp. 1-16.
(Continued)

*Primary Examiner* — George C Monikang

(57) ABSTRACT

Improved methods and/or apparatus for decoding an encoded audio signal in soundfield format for L loudspeakers. The method and/or apparatus can render an Ambisonics format audio signal to 2D loudspeaker setup(s) based on a rendering matrix. The rendering matrix has elements based on loudspeaker positions and wherein the rendering matrix is determined based on weighting at least an element of a first matrix with a weighting factor $$g = \frac{1}{\sqrt{L}}.$$

(Continued)

The first matrix is determined based on positions of the L loudspeakers and at least a virtual position of at least a virtual loudspeaker that is added to the positions of the L loudspeakers.

3 Claims, 7 Drawing Sheets

Related U.S. Application Data continuation of application No. 17/231,291, filed on Apr. 15, 2021, now Pat. No. 11,451,918, which is a division of application No. 16/903,238, filed on Jun. 16, 2020, now Pat. No. 10,986,455, which is a division of application No. 16/189,732, filed on Nov. 13, 2018, now Pat. No. 10,694,308, which is a division of application No. 15/718,471, filed on Sep. 28, 2017, now Pat. No. 10,158,959, which is a division of application No. 15/030,066, filed as application No. PCT/EP2014/072411 on Oct. 20, 2014, now Pat. No. 9,813,834.

(51) Int. Cl.
*H04R 5/02* (2006.01)
*H04S 5/02* (2006.01)
*H04S 7/00* (2006.01)

(58) Field of Classification Search
USPC ................................ 381/17–19, 22–23, 310
See application file for complete search history.

(56) References Cited

U.S. PATENT DOCUMENTS

| | | | |
|---|---|---|---|
| 8,111,830 | B2 | 2/2012 | Moon |
| 8,379,868 | B2 | 2/2013 | Goodwin |
| 9,100,768 | B2 | 8/2015 | Batke |
| 2007/0140498 | A1 | 6/2007 | Moon |
| 2009/0323848 | A1 | 12/2009 | Guthy |
| 2010/0183178 | A1 | 7/2010 | Kellermann et al. |
| 2010/0198601 | A1 | 8/2010 | Mouhssine |
| 2011/0091044 | A1 | 4/2011 | Lee |
| 2013/0148812 | A1 | 6/2013 | Corteel |
| 2013/0202118 | A1 | 8/2013 | Yamamoto |
| 2022/0417690 | A1 | 12/2022 | Keiler |

FOREIGN PATENT DOCUMENTS

| | | | |
|---|---|---|---|
| CN | 101884065 | A | 11/2010 |
| CN | 102013256 | A | 4/2011 |
| CN | 102547549 | A | 7/2012 |
| CN | 102823277 | A | 12/2012 |
| CN | 102932730 | A | 2/2013 |
| CN | 103250207 | A | 8/2013 |
| CN | 108632737 | A | 10/2018 |
| EP | 0629335 | A1 | 12/1994 |
| EP | 2094032 | A1 | 8/2009 |
| EP | 2124351 | B1 | 12/2010 |
| EP | 2645748 | A1 | 10/2013 |
| JP | 2006-506918 | A | 2/2006 |
| JP | 2011-211312 | A | 10/2011 |
| KR | 100964353 | B1 | 6/2010 |
| RU | 2011117698 | A1 | 11/2012 |
| WO | 2007/114624 | A1 | 10/2007 |
| WO | 2008046531 | A1 | 4/2008 |
| WO | 2009/128078 | A1 | 10/2009 |
| WO | 2011/117399 | A1 | 9/2011 |
| WO | 2011/129304 | A1 | 10/2011 |
| WO | 2012/059385 | A1 | 5/2012 |
| WO | 2013/000740 | A1 | 1/2013 |
| WO | 2013/149867 | A1 | 3/2013 |
| WO | 2013/068283 | A1 | 5/2013 |
| WO | 2013143934 | A1 | 10/2013 |
| WO | 2014/012945 | A1 | 1/2014 |

OTHER PUBLICATIONS

Morrell, M. et al "Surround Sound Using Variable-Ambisonics and Variable-Polar Pattern Theories" IEEE International Conference on Multimedia and Expo Workshops, Jul. 9-13, 2012, pp. 668.
Sun, H. et al "Optimal Higher Order Ambisonics Encoding with Predefined Constraints" IEEE Transactions on Audio, Speech, and Language Processing, vol. 20, Issue 3, Mar. 2012, pp. 742-754.
Xi-Ying, Luo "Brief Talk about Virtual Speakers" Production Department, Guangzhou Broadcasting Network, Guangzhou Guangdong, China, Aug. 2011.
Zotter et al., "All-Round Ambisonic Panning and Decoding", Journal of Audio Engineering Society, vol. 60, No. 10, Oct. 2012, pp. 807-820. D 2.
Zotter et al., "Energy-preserving ambisonic decoding", Acta Acustica united with Acustica, vol. 98, No. 1, Jan./Feb. 2012, pp. 34-37.

METHOD FOR AND APPARATUS FOR DECODING/RENDERING AN AMBISONICS AUDIO SOUNDFIELD REPRESENTATION FOR AUDIO PLAYBACK USING 2D SETUPS

CROSS REFERENCE TO RELATED APPLICATIONS

This application is a continuation of U.S. patent application Ser. No. 17/893,729, filed Aug. 23, 2022, which is a continuation of U.S. patent application Ser. No. 17/231,291, filed Apr. 15, 2021, now U.S. Pat. No. 11,451,918, which is a divisional of U.S. patent application Ser. No. 16/903,238, filed Jun. 16, 2020, now U.S. Pat. No. 10,986,455, which is a divisional of U.S. patent application Ser. No. 16/189,732, filed Nov. 13, 2018, now U.S. Pat. No. 10,694,308, which is a divisional of U.S. patent application Ser. No. 15/718,471, filed Sep. 28, 2017, now U.S. Pat. No. 10,158,959, which is a divisional of U.S. patent application Ser. No. 15/030,066, filed Apr. 17, 2016, now U.S. Pat. No. 9,813,834, which is U.S. National Stage of International Application No. PCT/EP2014/072411, filed Oct. 20, 2014, which claims priority to European Patent Application No. 13290255.2, filed Oct. 23, 2013, each of which is incorporated by reference in its entirety.

FIELD OF THE INVENTION

This invention relates to a method and an apparatus for decoding an audio soundfield representation, and in particular an Ambisonics formatted audio representation, for audio playback using a 2D or near-2D setup.

BACKGROUND

Accurate localization is a key goal for any spatial audio reproduction system. Such reproduction systems are highly applicable for conference systems, games, or other virtual environments that benefit from 3D sound. Sound scenes in 3D can be synthesized or captured as a natural sound field. Soundfield signals such as e.g. Ambisonics carry a representation of a desired sound field. A decoding process is required to obtain the individual loudspeaker signals from a sound field representation. Decoding an Ambisonics formatted signal is also referred to as "rendering". In order to synthesize audio scenes, panning functions that refer to the spatial loudspeaker arrangement are required for obtaining a spatial localization of the given sound source. For recording a natural sound field, microphone arrays are required to capture the spatial information. The Ambisonics approach is a very suitable tool to accomplish this. Ambisonics formatted signals carry a representation of the desired sound field, based on spherical harmonic decomposition of the soundfield. While the basic Ambisonics format or B-format uses spherical harmonics of order zero and one, the so-called Higher Order Ambisonics (HOA) uses also further spherical harmonics of at least $2^{nd}$ order. The spatial arrangement of loudspeakers is referred to as loudspeaker setup. For the decoding process, a decode matrix (also called rendering matrix) is required, which is specific for a given loudspeaker setup and which is generated using the known loudspeaker positions.

Commonly used loudspeaker setups are the stereo setup that employs two loudspeakers, the standard surround setup that uses five loudspeakers, and extensions of the surround setup that use more than five loudspeakers. However, these well-known setups are restricted to two dimensions (2D), e.g. no height information is reproduced. Rendering for known loudspeaker setups that can reproduce height information has disadvantages in sound localization and coloration: either spatial vertical pans are perceived with very uneven loudness, or loudspeaker signals have strong side lobes, which is disadvantageous especially for off-center listening positions. Therefore, a so-called energy-preserving rendering design is preferred when rendering a HOA sound field description to loudspeakers. This means that rendering of a single sound source results in loudspeaker signals of constant energy, independent of the direction of the source. In other words, the input energy carried by the Ambisonics representation is preserved by the loudspeaker renderer. The International patent publication WO2014/012945A1 [1] from the present inventors describes a HOA renderer design with good energy preserving and localization properties for 3D loudspeaker setups. However, while this approach works quite well for 3D loudspeaker setups that cover all directions, some source directions are attenuated for 2D loudspeaker setups (like e.g. 5.1 surround). This applies especially for directions where no loudspeakers are placed, e.g. from the top.

In F. Zotter and M. Frank, "All-Round Ambisonic Panning and Decoding" [2], an "imaginary" loudspeaker is added if there is a hole in the convex hull built by the loudspeakers. However, the resulting signal for that imaginary loudspeaker is omitted for playback on the real loudspeaker. Thus, a source signal from that direction (i.e. a direction where no real loudspeaker is positioned) will still be attenuated. Furthermore, that paper shows the use of the imaginary loudspeaker for use with VBAP (vector base amplitude panning) only.

SUMMARY OF THE INVENTION

Therefore, it is a remaining problem to design energy-preserving Ambisonics renderers for 2D (2-dimensional) loudspeaker setups, wherein sound sources from directions where no loudspeakers are placed are less attenuated or not attenuated at all. 2D loudspeaker setups can be classified as those where the loudspeakers' elevation angles are within a defined small range (e.g. $<10°$), so that they are close to the horizontal plane.

The present specification describes a solution for rendering/decoding an Ambisonics formatted audio soundfield representation for regular or non-regular spatial loudspeaker distributions, wherein the rendering/decoding provides highly improved localization and coloration properties and is energy preserving, and wherein even sound from directions in which no loudspeaker is available is rendered. Advantageously, sound from directions in which no loudspeaker is available is rendered with substantially the same energy and perceived loudness that it would have if a loudspeaker was available in the respective direction. Of course, an exact localization of these sound sources is not possible since no loudspeaker is available in its direction.

In particular, at least some described embodiments provide a new way to obtain the decode matrix for decoding sound field data in HOA format. Since at least the HOA format describes a sound field that is not directly related to loudspeaker positions, and since loudspeaker signals to be obtained are necessarily in a channel-based audio format, the decoding of HOA signals is always tightly related to rendering the audio signal. In principle, the same applies also to other audio soundfield formats. Therefore the present disclosure relates to both decoding and rendering sound field related audio formats. The terms decode matrix and rendering matrix are used as synonyms.

To obtain a decode matrix for a given setup with good energy preserving properties, one or more virtual loudspeakers are added at positions where no loudspeaker is available. For example, for obtaining an improved decode matrix for a 2D setup, two virtual loudspeakers are added at the top and bottom (corresponding to elevation angles +90° and −90°, with the 2D loudspeakers placed approximately at an elevation of 0°). For this virtual 3D loudspeaker setup, a decode matrix is designed that satisfies the energy preserving property. Finally, weighting factors from the decode matrix for the virtual loudspeakers are mixed with constant gains to the real loudspeakers of the 2D setup.

According to one embodiment, a decode matrix (or rendering matrix) for rendering or decoding an audio signal in Ambisonics format to a given set of loudspeakers is generated by generating a first preliminary decode matrix using a conventional method and using modified loudspeaker positions, wherein the modified loudspeaker positions include loudspeaker positions of the given set of loudspeakers and at least one additional virtual loudspeaker position, and downmixing the first preliminary decode matrix, wherein coefficients relating to the at least one additional virtual loudspeaker are removed and distributed to coefficients relating to the loudspeakers of the given set of loudspeakers. In one embodiment, a subsequent step of normalizing the decode matrix follows. The resulting decode matrix is suitable for rendering or decoding the Ambisonics signal to the given set of loudspeakers, wherein even sound from positions where no loudspeaker is present is reproduced with correct signal energy. This is due to the construction of the improved decode matrix. Preferably, the first preliminary decode matrix is energy-preserving.

In one embodiment, the decode matrix has L rows and $O_{3D}$ columns. The number of rows corresponds to the number of loudspeakers in the 2D loudspeaker setup, and the number of columns corresponds to the number of Ambisonics coefficients $O_{3D}$, which depends on the HOA order N according to $O_{3D}=(N+1)^2$. Each of the coefficients of the decode matrix for a 2D loudspeaker setup is a sum of at least a first intermediate coefficient and a second intermediate coefficient. The first intermediate coefficient is obtained by an energy-preserving 3D matrix design method for the current loudspeaker position of the 2D loudspeaker setup, wherein the energy-preserving 3D matrix design method uses at least one virtual loudspeaker position. The second intermediate coefficient is obtained by a coefficient that is obtained from said energy-preserving 3D matrix design method for the at least one virtual loudspeaker position, multiplied with a weighting factor g. In one embodiment, the weighting factor g is calculated according to $$g = \frac{1}{\sqrt{L}},$$

wherein L is the number of loudspeakers in the 2D loudspeaker setup. In one embodiment, there is are methods and/or apparatus for rendering an Ambisonics format audio signal to a 2D loudspeaker setup. The Ambisonics format audio signal may be rendered to a representation of L loudspeakers based on a rendering matrix. The rendering matrix has elements based on loudspeaker positions and wherein the rendering matrix is determined based on weighting at least an element of a first matrix with a weighting factor $$g = \frac{1}{\sqrt{L}}.$$

The first matrix is determined based on positions of the L loudspeakers and at least a virtual position of at least a virtual loudspeaker that is added to the positions of the L loudspeakers.

In one embodiment, the invention relates to a computer readable storage medium having stored thereon executable instructions to cause a computer to perform a method comprising steps of the method disclosed above or in the claims.

Advantageous embodiments are disclosed in the dependent claims, the following description and the figures.

BRIEF DESCRIPTION OF THE DRAWINGS

Exemplary embodiments of the invention are described with references to the accompanying drawings.

DETAILED DESCRIPTION OF EMBODIMENTS

Figure 1:
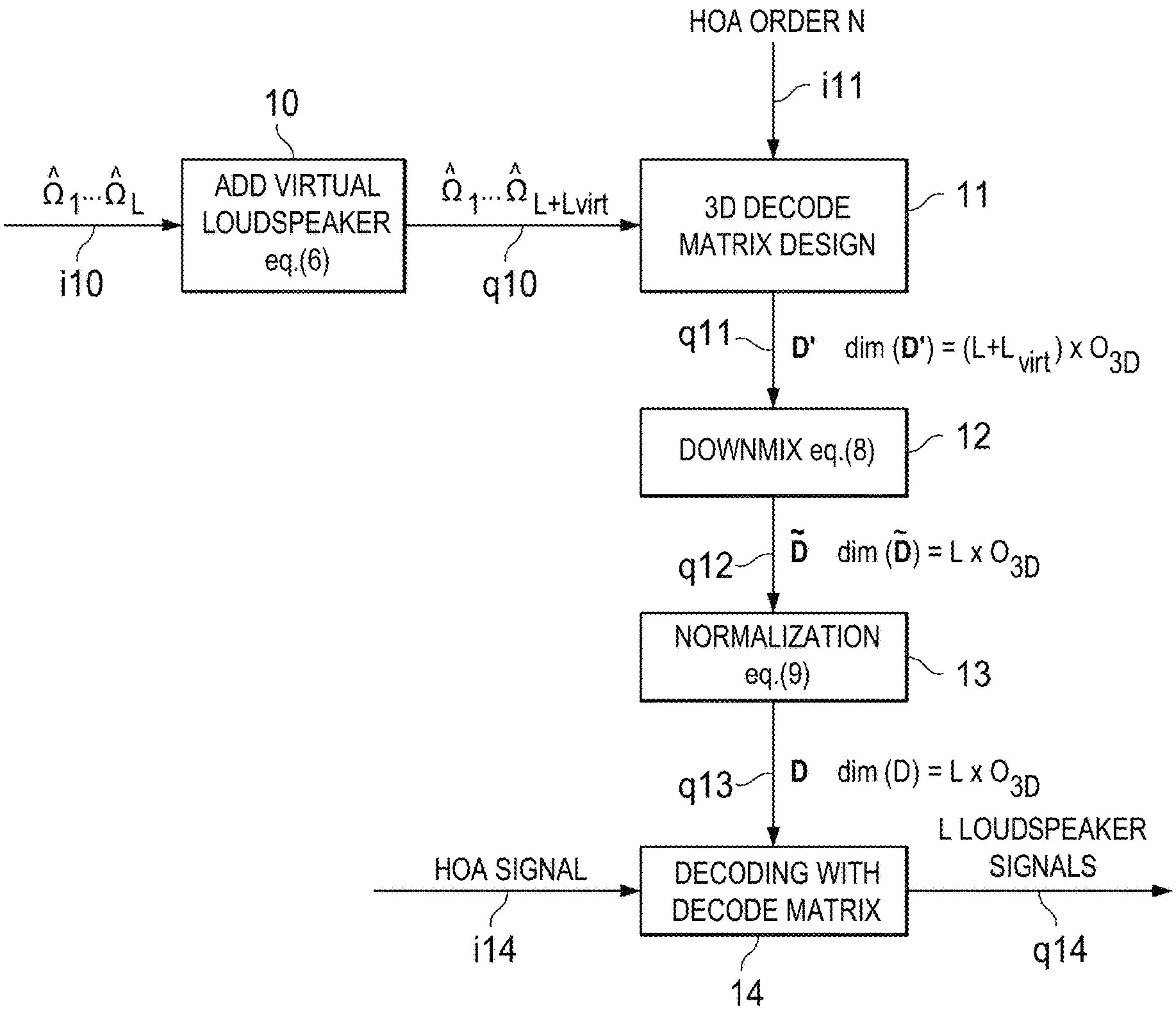
FIG. 1 depicts a flow-chart of a method according to one embodiment.

FIG. 1 shows a flow-chart of a method for decoding an audio signal, in particular a soundfield signal, according to one embodiment. The decoding of soundfield signals generally requires positions of the loudspeakers to which the audio signal shall be rendered. Such loudspeaker positions $\hat{\Omega}_1 \ldots \hat{\Omega}_L$ for L loudspeakers are input i10 to the process. Note that when positions are mentioned, actually spatial directions are meant herein, i.e. positions of loudspeakers are defined by their inclination angles $\theta_l$ and azimuth angles $\phi_l$, which are combined into a vector $\hat{\Omega}_l=[\theta_l, \phi_l]^T$. Then, at least one position of a virtual loudspeaker is added 10. In one embodiment, all loudspeaker positions that are input to the process i10 are substantially in the same plane, so that they constitute a 2D setup, and the at least one virtual loudspeaker that is added is outside this plane. In one particularly advantageous embodiment, all loudspeaker positions that are input to the process i10 are substantially in the same plane and the positions of two virtual loudspeakers are added in step 10. Advantageous positions of the two virtual loudspeakers are described below. In one embodiment, the addition is performed according to Eq. (6) below. The adding step 10 results in a modified set of loudspeaker angles $\hat{\Omega}'_1 \ldots \hat{\Omega}'_{L+Lvirt}$ at q10. $L_{virt}$ is the number of virtual loudspeakers. The modified set of loudspeaker angles is used in a 3D decode matrix design step 11. Also the HOA order N (generally the order of coefficients of the soundfield signal) needs to be provided i11 to the step 11.

The 3D decode matrix design step 11 performs any known method for generating a 3D decode matrix. Preferably the 3D decode matrix is suitable for an energy-preserving type of decoding/rendering. For example, the method described in PCT/EP2013/065034 can be used. The 3D decode matrix design step 11 results in a decode matrix or rendering matrix D' that is suitable for rendering $L'=L+L_{virt}$ loudspeaker signals, with $L_{virt}$ being the number of virtual loudspeaker positions that were added in the "virtual loudspeaker position adding" step 10.

Since only L loudspeakers are physically available, the decode matrix D' that results from the 3D decode matrix design step 11 needs to be adapted to the L loudspeakers in a downmix step 12. This step performs downmixing of the decode matrix D', wherein coefficients relating to the virtual loudspeakers are weighted and distributed to the coefficients relating to the existing loudspeakers. Preferably, coefficients of any particular HOA order (i.e. column of the decode matrix D') are weighted and added to the coefficients of the same HOA order (i.e. the same column of the decode matrix D'). One example is a downmixing according to Eq. (8) below. The downmixing step 12 results in a downmixed 3D decode matrix $\tilde{D}$ that has L rows, i.e. less rows than the decode matrix D', but has the same number of columns as the decode matrix D'. In other words, the dimension of the decode matrix D' is $(L+L_{virt})\times O_{3D}$, and the dimension of the downmixed 3D decode matrix $\tilde{D}$ is $L\times O_{3D}$.

Figure 2:
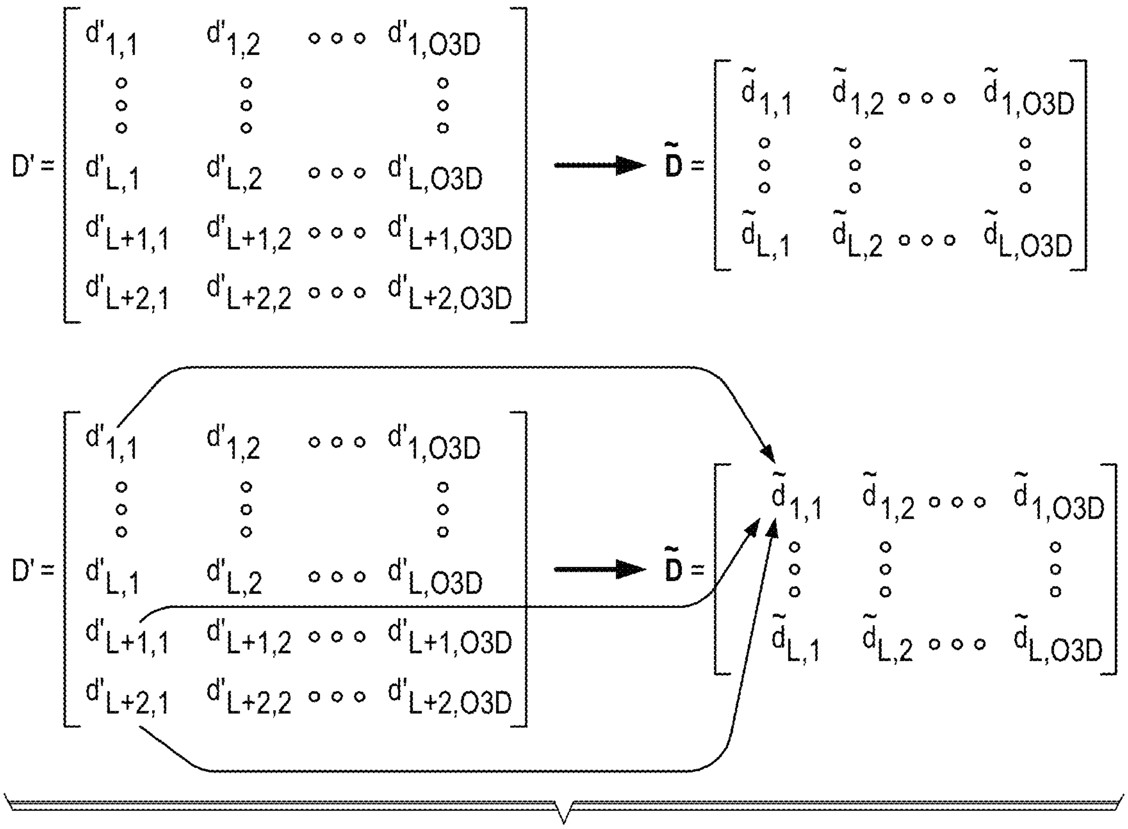
FIG. 2 depicts an exemplary construction of a downmixed HOA decode matrix.

FIG. 2 shows an exemplarily construction of a downmixed HOA decode matrix $\tilde{D}$ from a HOA decode matrix D'. The HOA decode matrix D' has L+2 rows, which means that two virtual loudspeaker positions have been added to the L available loudspeaker positions, and $O_{3D}$ columns, with $O_{3D}=(N+1)^2$ and N being the HOA order. In the downmixing step 12, the coefficients of rows L+1 and L+2 of the HOA decode matrix D' are weighted and distributed to the coefficients of their respective column, and the rows L+1 and L+2 are removed. For example, the first coefficients $d'_{L+1,1}$ and $d'_{L+2,1}$ of each of the rows L+1 and L+2 are weighted and added to the first coefficients of each remaining row, such as $d'_{1,1}$. The resulting coefficient $\tilde{d}_{1,1}$ of the downmixed HOA decode matrix $\tilde{D}$ is a function of $d'_{1,1}$, $d'_{L+1,1}$, $d'_{L+2,1}$ and the weighting factor g. In the same manner, e.g. the resulting coefficient $\tilde{d}_{2,1}$ of the downmixed HOA decode matrix $\tilde{D}$ is a function of $d'_{2,1}$, $d'_{L+1,1}$, $d'_{L+2,1}$ and the weighting factor g, and the resulting coefficient $\tilde{d}_{1,2}$ of the downmixed HOA decode matrix $\tilde{D}$ is a function of $d'_{1,2}$, $d'_{L+1,2}$, $d'_{L+2,2}$ and the weighting factor g.

Usually, the downmixed HOA decode matrix $\tilde{D}$ will be normalized in a normalization step 13. However, this step 13 is optional since also a non-normalized decode matrix could be used for decoding a soundfield signal. In one embodiment, the downmixed HOA decode matrix $\tilde{D}$ is normalized according to Eq. (9) below. The normalization step 13 results in a normalized downmixed HOA decode matrix D, which has the same dimension $L\times O_{3D}$ as the downmixed HOA decode matrix $\tilde{D}$.

The normalized downmixed HOA decode matrix D can then be used in a soundfield decoding step 14, where an input soundfield signal i14 is decoded to L loudspeaker signals q14. Usually the normalized downmixed HOA decode matrix D needs not be modified until the loudspeaker setup is modified. Therefore, in one embodiment the normalized downmixed HOA decode matrix D is stored in a decode matrix storage.

Figure 3:
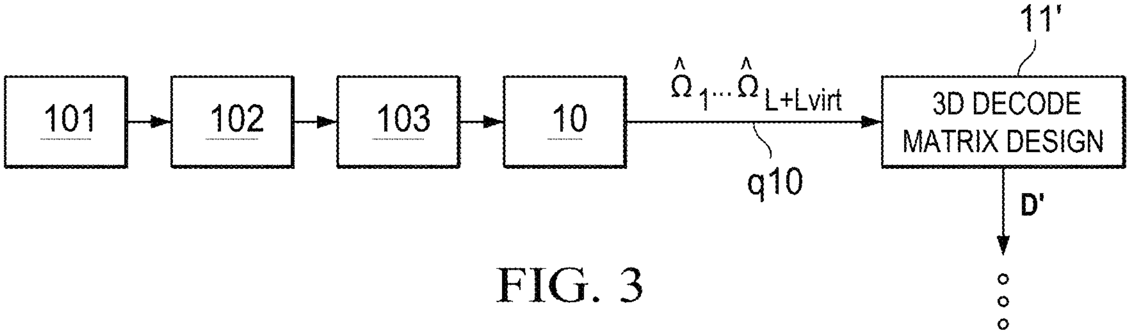
FIG. 3 depicts a flow-chart for obtaining and modifying loudspeaker positions.

FIG. 3 shows details of how, in an embodiment, the loudspeaker positions are obtained and modified. This embodiment comprises steps of determining 101 positions $\hat{\Omega}_1 \ldots \hat{\Omega}_L$ of the L loudspeakers and an order N of coefficients of the soundfield signal, determining 102 from the positions that the L loudspeakers are substantially in a 2D plane, and generating 103 at least one virtual position $\hat{\Omega}_{L+1}'$ of a virtual loudspeaker.

In one embodiment, the at least one virtual position $\hat{\Omega}_{L+1}'$ is one of $\hat{\Omega}_{L+1}'=[0, 0]^T$ and $\hat{\Omega}_{L+1}'=[\pi, 0]^T$.

In one embodiment, two virtual positions $\hat{\Omega}_{L+1}'$ and $\hat{\Omega}'_{L+2}$ corresponding to two virtual loudspeakers are generated 103, with $\hat{\Omega}_{L+1}'=[0, 0]^T$ and $\hat{\Omega}'_{L+2}=[\pi, 0]^T$.

According to one embodiment, a method for decoding an encoded audio signal for L loudspeakers at known positions comprises steps of determining 101 positions $\hat{\Omega}_1 \ldots \hat{\Omega}_L$ of the L loudspeakers and an order N of coefficients of the soundfield signal, determining 102 from the positions that the L loudspeakers are substantially in a 2D plane, generating 103 at least one virtual position $\hat{\Omega}_{L+1}'$ of a virtual loudspeaker, generating 11 a 3D decode matrix D', wherein the determined positions $\hat{\Omega}_1 \ldots \hat{\Omega}_L$ of the L loudspeakers and the at least one virtual position $\hat{\Omega}_{L+1}'$ are used and the 3D decode matrix D' has coefficients for said determined and virtual loudspeaker positions, downmixing 12 the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and decoding 14 the encoded audio signal i14 using the downscaled 3D decode matrix $\tilde{D}$, wherein a plurality of decoded loudspeaker signals q14 is obtained.

In one embodiment, the encoded audio signal is a soundfield signal, e.g. in HOA format.

In one embodiment, the at least one virtual position $\hat{\Omega}_{L+1}'$ of a virtual loudspeaker is one of $\hat{\Omega}_{L+1}'=[0, 0]^T$ and $\hat{\Omega}_{L+1}'=[\pi, 0]^T$.

In one embodiment, the coefficients for the virtual loudspeaker positions are weighted with a weighting factor $$g = \frac{1}{\sqrt{L}}.$$

In one embodiment, the method has an additional step of normalizing the downscaled 3D decode matrix $\tilde{D}$, wherein a normalized downscaled 3D decode matrix D is obtained, and the step of decoding 14 the encoded audio signal i14 uses the normalized downscaled 3D decode matrix D. In one embodiment, the method has an additional step of storing the downscaled 3D decode matrix $\tilde{D}$ or the normalized downmixed HOA decode matrix D in a decode matrix storage.

According to one embodiment, a decode matrix for rendering or decoding a soundfield signal to a given set of loudspeakers is generated by generating a first preliminary decode matrix using a conventional method and using modified loudspeaker positions, wherein the modified loudspeaker positions include loudspeaker positions of the given set of loudspeakers and at least one additional virtual loudspeaker position, and downmixing the first preliminary decode matrix, wherein coefficients relating to the at least one additional virtual loudspeaker are removed and distributed to coefficients relating to the loudspeakers of the given set of loudspeakers. In one embodiment, a subsequent step of normalizing the decode matrix follows. The resulting decode matrix is suitable for rendering or decoding the soundfield signal to the given set of loudspeakers, wherein even sound from positions where no loudspeaker is present is reproduced with correct signal energy. This is due to the construction of the improved decode matrix. Preferably, the first preliminary decode matrix is energy-preserving.

Figure 4A:
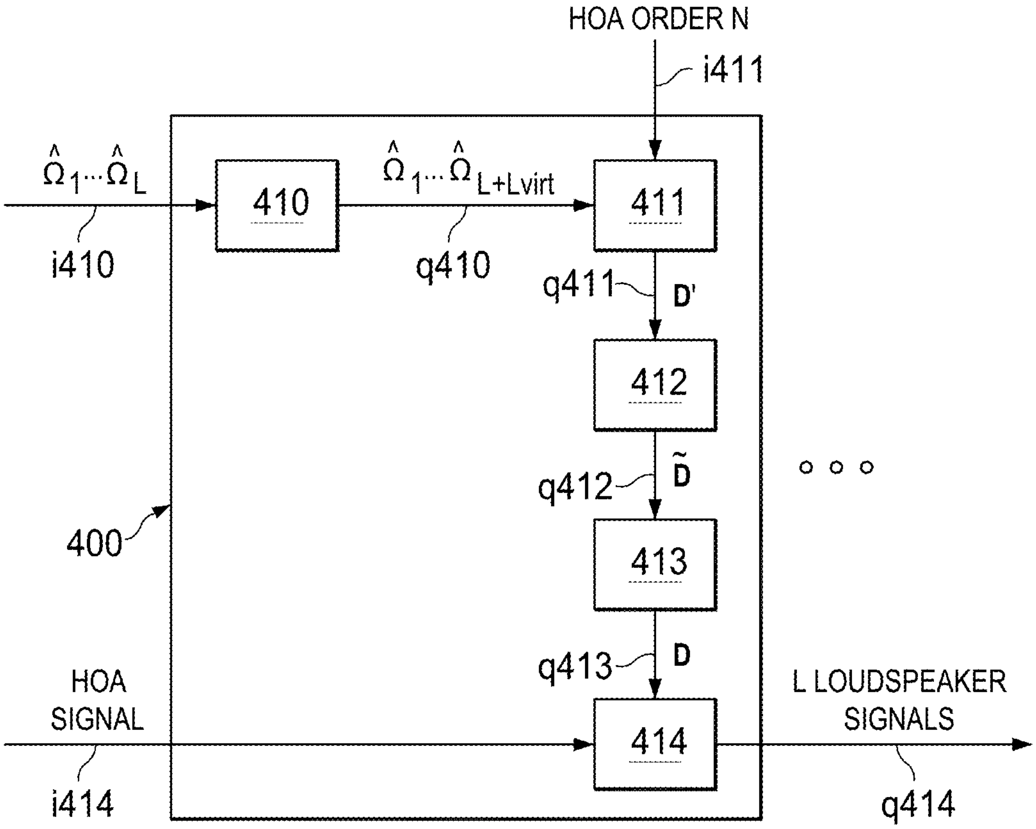
FIGS. 4*a* and 4*b* depict a block diagram of an apparatus according to one embodiment.

FIG. 4*a* shows a block diagram of an apparatus according to one embodiment. The apparatus 400 for decoding an encoded audio signal in soundfield format for L loudspeakers at known positions comprises an adder unit 410 for adding at least one position of at least one virtual loudspeaker to the positions of the L loudspeakers, a decode matrix generator unit 411 for generating a 3D decode matrix D', wherein the positions $\hat{\Omega}_1 \ldots \hat{\Omega}_L$ of the L loudspeakers and the at least one virtual position $\hat{\Omega}_{L+1}'$ are used and the 3D decode matrix D' has coefficients for said determined and virtual loudspeaker positions, a matrix downmixing unit 412 for downmixing the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and decoding unit 414 for decoding the encoded audio signal using the downscaled 3D decode matrix $\tilde{D}$, wherein a plurality of decoded loudspeaker signals is obtained.

In one embodiment, the apparatus further comprises a normalizing unit 413 for normalizing the downscaled 3D decode matrix $\tilde{D}$, wherein a normalized downscaled 3D decode matrix D is obtained, and the decoding unit 414 uses the normalized downscaled 3D decode matrix D.

Figure 4B:
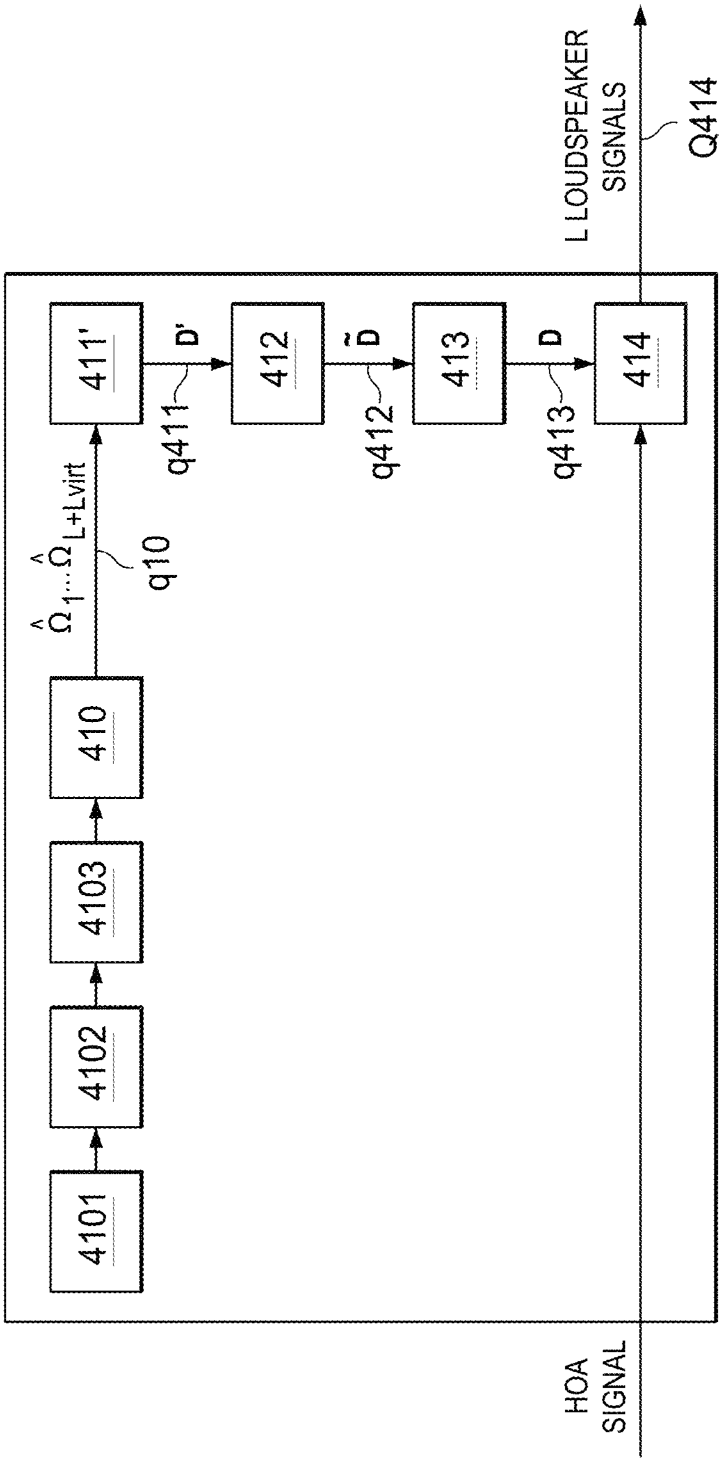

In one embodiment shown in FIG. 4*b*, the apparatus further comprises a first determining unit 4101 for determining positions ($\Omega_L$) of the L loudspeakers and an order N of coefficients of the soundfield signal, a second determining unit 4102 for determining from the positions that the L loudspeakers are substantially in a 2D plane, and a virtual loudspeaker position generating unit 4103 for generating at least one virtual position ($\hat{\Omega}_{L+1}'$) of a virtual loudspeaker.

In one embodiment, the apparatus further comprises a plurality of band pass filters 715*b* for separating the encoded audio signal into a plurality of frequency bands, wherein a plurality of separate 3D decode matrices $D_b'$ are generated 711*b*, one for each frequency band, and each 3D decode matrix $D_b'$ is downmixed 712*b* and optionally normalized separately, and wherein the decoding unit 714*b* decodes each frequency band separately. In this embodiment, the apparatus further comprises a plurality of adder units 716*b*, one for each loudspeaker. Each adder unit adds up the frequency bands that relate to the respective loudspeaker.

Each of the adder unit 410, decode matrix generator unit 411, matrix downmixing unit 412, normalization unit 413, decoding unit 414, first determining unit 4101, second determining unit 4102 and virtual loudspeaker position generating unit 4103 can be implemented by one or more processors, and each of these units may share the same processor with any other of these or other units.

Figure 7:
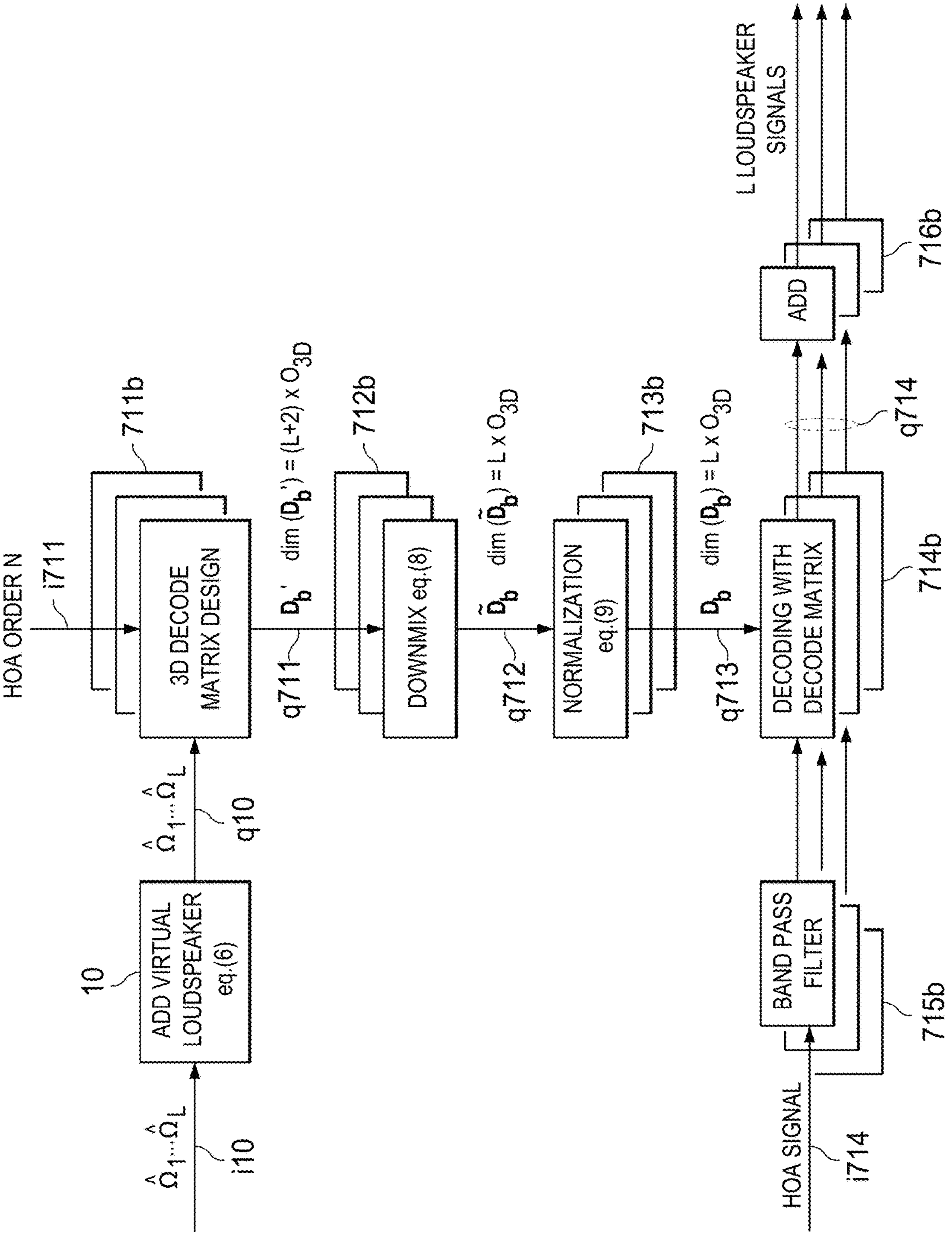
FIG. 7 depicts usage of separately optimized decode matrices for different frequency bands.

FIG. 7 shows an embodiment that uses separately optimized decode matrices for different frequency bands of the input signal. In this embodiment, the decoding method comprises a step of separating the encoded audio signal into a plurality of frequency bands using band pass filters. A plurality of separate 3D decode matrices $D_b'$ are generated 711*b*, one for each frequency band, and each 3D decode matrix $D_b'$ is downmixed 712*b* and optionally normalized separately. The decoding 714*b* of the encoded audio signal is per-formed for each frequency band separately. This has the advantage that frequency-dependent differences in human perception can be taken into consideration, and can lead to different decode matrices for different frequency bands. In one embodiment, only one or more (but not all) of the decode matrices are generated by adding virtual loudspeaker positions and then weighting and distributing their coefficients to coefficients for existing loudspeaker positions as described above. In another embodiment, each of the decode matrices is generated by adding virtual loudspeaker positions and then weighting and distributing their coefficients to coefficients for existing loudspeaker positions as described above. Finally, all the frequency bands that relate to the same loudspeaker are added up in one frequency band adder unit 716*b* per loudspeaker, in an operation reverse to the frequency band splitting.

Each of the adder unit 410, decode matrix generator unit 711*b*, matrix downmixing unit 712*b*, normalization unit 713*b*, decoding unit 714*b*, frequency band adder unit 716*b* and band pass filter unit 715*b* can be implemented by one or more processors, and each of these units may share the same processor with any other of these or other units.

One aspect of the present disclosure is to obtain a rendering matrix for a 2D setup with good energy preserving properties. In one embodiment, two virtual loudspeakers are added at the top and bottom (elevation angles +90° and −90° with the 2D loudspeakers placed approximately at an elevation of 0°). For this virtual 3D loudspeaker setup, a rendering matrix is designed that satisfies the energy preserving property. Finally the weighting factors from the rendering matrix for the virtual loudspeakers are mixed with constant gains to the real loudspeakers of the 2D setup.

In the following, Ambisonics (in particular HOA) rendering is described.

Ambisonics rendering is the process of computation of loudspeaker signals from an Ambisonics soundfield description. Sometimes it is also called Ambisonics decoding. A 3D Ambisonics soundfield representation of order N is considered, where the number of coefficients is $$O_{3D}=(N+1)^2 \qquad (1)$$

The coefficients for time sample t are represented by vector $b(t)\in\mathbb{C}^{O_{3D}\times 1}$ with $O_{3D}$ elements. With the rendering matrix $D\in\mathbb{C}^{L\times O_{3D}}$ the loudspeaker signals for time sample t are computed by $$w(t)=Db(t) \qquad (2)$$

with $D\in\mathbb{C}^{L\times O_{3D}}$ and $w\in\mathbb{R}^{L\times 1}$ and L being the number of loudspeakers.

The positions of the loudspeakers are defined by their inclination angles $\theta_l$ and azimuth angles $\phi_l$ which are combined into a vector $\hat{\Omega}_l=[\theta_l, \phi_l]^T$ for l=1, . . . , L. Different loudspeaker distances from the listening position are compensated by using individual delays for the loudspeaker channels.

Signal energy in the HOA domain is given by $$E=b^Hb \qquad (3)$$

where H denotes (conjugate complex) transposed. The corresponding energy of the loudspeaker signals is computed by $$\hat{E}=w^Hw=b^HD^HDb. \qquad (4)$$

The ratio $\hat{E}/E$ for an energy preserving decode/rendering matrix should be constant in order to achieve energy-preserving decoding/rendering.

In principle, the following extension for improved 2D rendering is proposed: For the design of rendering matrices for 2D loudspeaker setups, one or more virtual loudspeakers are added. 2D setups are understood as those where the loudspeakers' elevation angles are within a defined small range, so that they are close to the horizontal plane. This can be expressed by $$\left|\theta_l - \frac{\pi}{2}\right| \leq \theta_{thres2d};\ \ l = 1, \ldots, L \tag{5}$$

The threshold value $\theta_{thres2d}$ is normally chosen to correspond to a value in the range of 5° to 10°, in one embodiment.

For the rendering design, a modified set of loudspeaker angles $\hat{\Omega}'_l$ is defined. The last (in this example two) loudspeaker positions are those of two virtual loudspeakers at the north and south poles (in vertical direction, ie. top and bottom) of the polar coordinate system:

$$\hat{\Omega}_l'=\hat{\Omega}_l;\ l=1, \ldots, L$$

$$\hat{\Omega}_{L+1}'[0,0]^T$$

$$\hat{\Omega}_{L+2}'=[\pi,0]^T \tag{6}$$

Thus, the new number of loudspeaker used for the rendering design is L'=L+2. From these modified loudspeaker positions, a rendering matrix $D'\in\mathbb{C}^{(L+2)\times O_{3D}}$ is designed with an energy preserving approach. For example, the design method described in [1] can be used. Now the final rendering matrix for the original loudspeaker setup is derived from D'. One idea is to mix the weighting factors for the virtual loudspeaker as defined in the matrix D' to the real loudspeakers. A fixed gain factor is used which is chosen as $$g = \frac{1}{\sqrt{L}}. \tag{7}$$

Coefficients of the intermediate matrix $\tilde{D}\in\mathbb{C}^{L\times O_{3D}}$ (also called downscaled 3D decode matrix herein) are defined by $$\tilde{d}_{l,q}=d_{l,q}'+g\cdot d_{L+1,q}'+g\cdot d_{L+2,q}' \text{ for } l=1, \ldots, L \text{ and } q=1, \ldots, O_{3D} \tag{8}$$

where $\tilde{d}_{l,q}$ is the matrix element of $\tilde{D}$ in the l-th row and the q-th column. In an optional final step, the intermediate matrix (downscaled 3D decode matrix) is normalized using the Frobenius norm:

$$D = \frac{\tilde{D}}{\sqrt{\sum_{l=1}^{L}\sum_{q=1}^{O_{3D}}|\tilde{d}_{l,q}|^2}} \tag{9}$$

Figure 5:
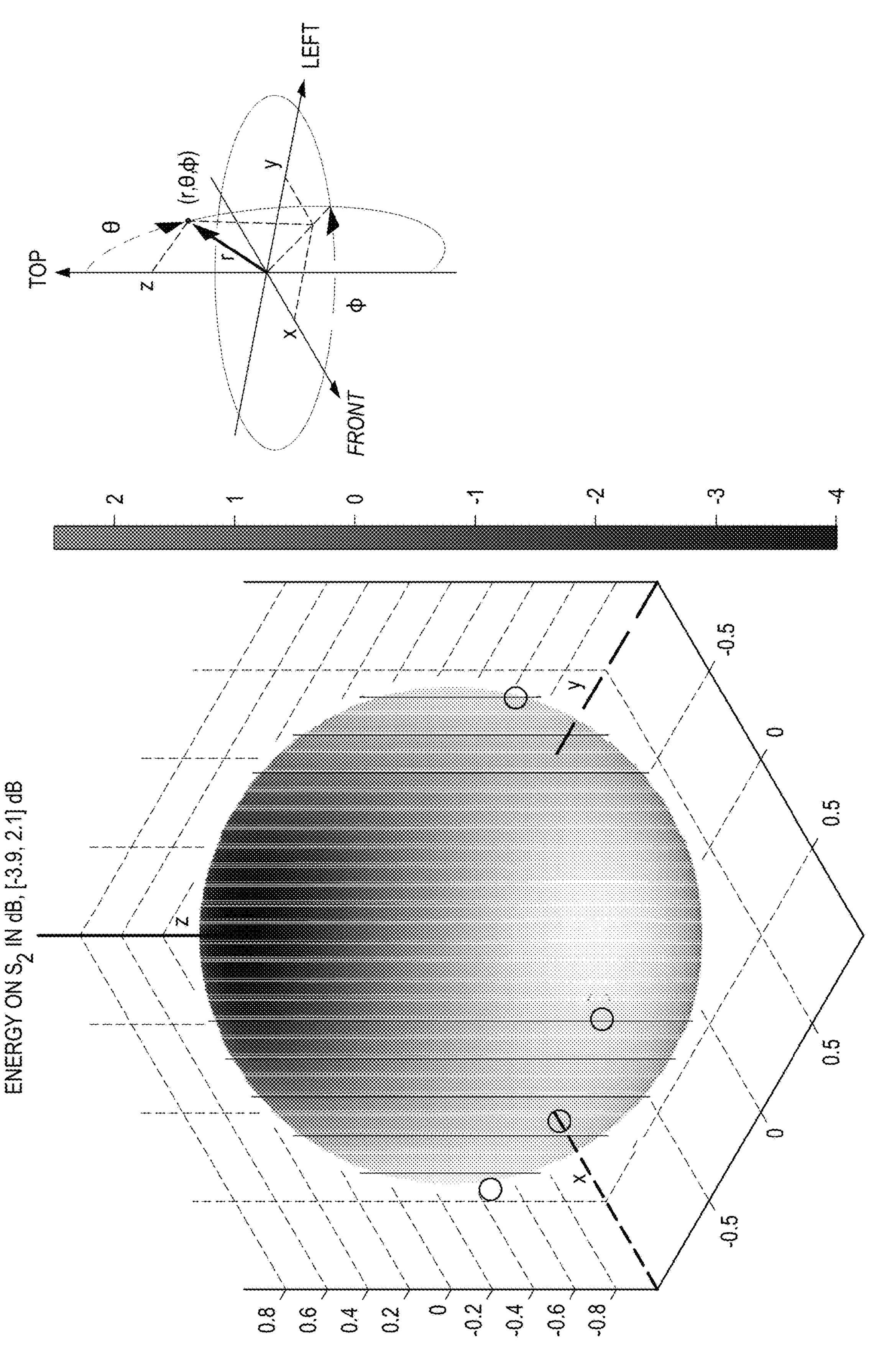
FIG. 5 depicts an energy distribution resulting from a conventional decode matrix.
Figure 6:
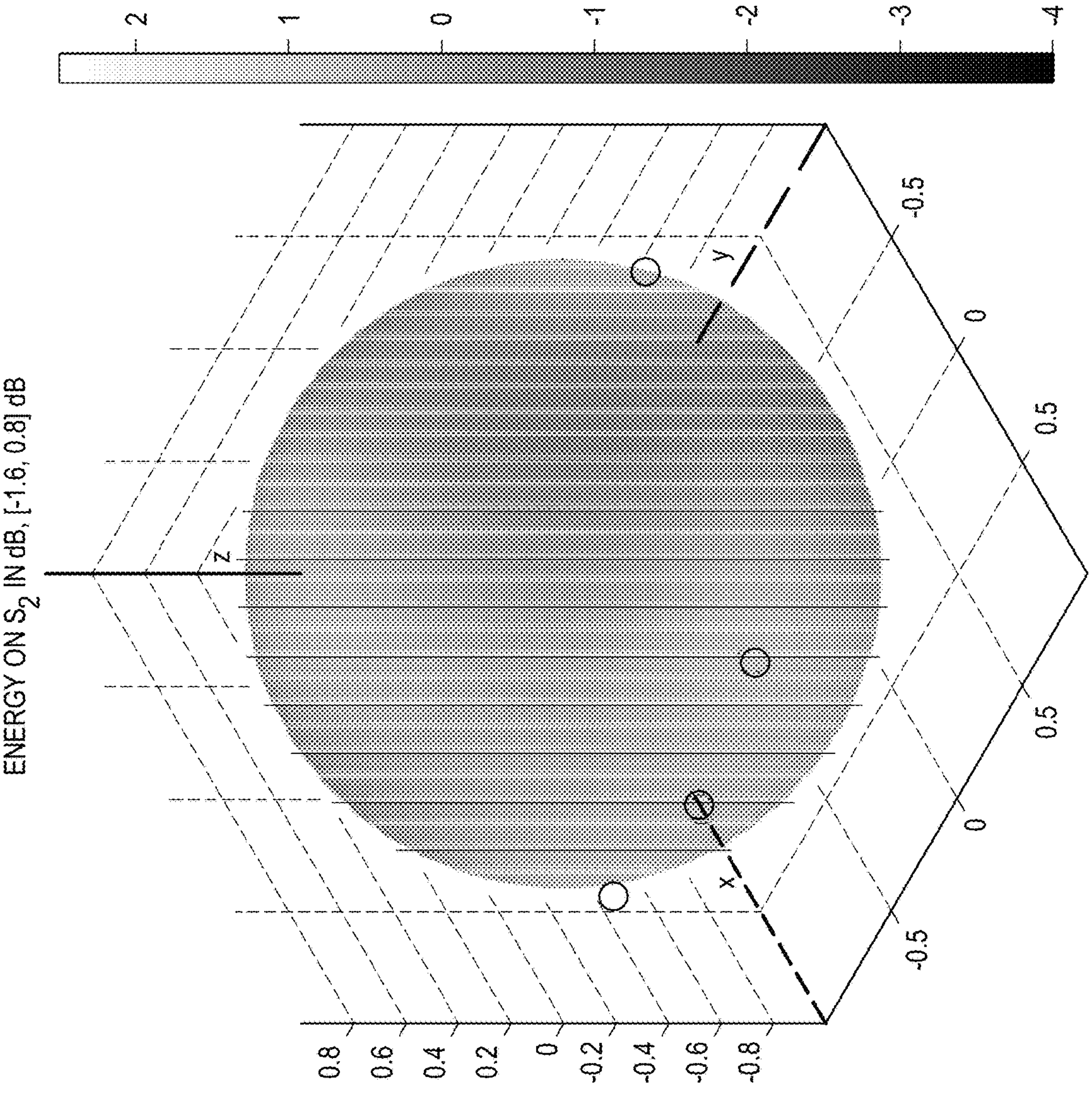
FIG. 6 depicts energy distribution resulting from a decode matrix according to embodiments.

FIGS. 5 and 6 show the energy distributions for a 5.0 surround loudspeaker setup. In both figures, the energy values are shown as greyscales and the circles indicate the loudspeaker positions. With the disclosed method, especially the attenuation at the top (and also bottom, not shown here) is clearly reduced.

FIG. 5 shows energy distribution resulting from a conventional decode matrix. Small circles around the z=0 plane represent loudspeaker positions. As can be seen, an energy range of [−3.9, . . . , 2.1] dB is covered, which results in energy differences of 6 dB. Further, signals from the top (and on the bottom, not visible) of the unit sphere are reproduced with very low energy, i.e. not audible, since no loudspeakers are available here.

FIG. 6 shows energy distribution resulting from a decode matrix according to one or more embodiments, with the same amount of loudspeakers being at the same positions as in FIG. 5. At least the following advantages are provided: first, a smaller energy range of [−1.6, . . . , 0.8] dB is covered, which results in smaller energy differences of only 2.4 dB. Second, signals from all directions of the unit sphere are reproduced with their correct energy, even if no loudspeakers are available here. Since these signals are reproduced through the available loudspeakers, their localization is not correct, but the signals are audible with correct loudness. In this example, signals from the top and on the bottom (not visible) become audible due to the decoding with the improved decode matrix.

In an embodiment, a method for decoding an encoded audio signal in Ambisonics format for L loudspeakers at known positions comprises steps of adding at least one position of at least one virtual loudspeaker to the positions of the L loudspeakers, generating a 3D decode matrix D', wherein the positions $\hat{\Omega}_1, \ldots, \hat{\Omega}_L$ of the L loudspeakers and the at least one virtual position $\hat{\Omega}_{L+1}'$ are used and the 3D decode matrix D' has coefficients for said determined and virtual loudspeaker positions, downmixing the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and decoding the encoded audio signal using the downscaled 3D decode matrix $\tilde{D}$, wherein a plurality of decoded loudspeaker signals is obtained.

In another embodiment, an apparatus for decoding an encoded audio signal in Ambisonics format for L loudspeakers at known positions comprises an adder unit 410 for adding at least one position of at least one virtual loudspeaker to the positions of the L loudspeakers, a decode matrix generator unit 411 for generating a 3D decode matrix D', wherein the positions $\hat{\Omega}_1, \ldots, \hat{\Omega}_L$ of the L loudspeakers and the at least one virtual position $\hat{\Omega}_{L+1}'$ are used and the 3D decode matrix D' has coefficients for said determined and virtual loudspeaker positions, a matrix downmixing unit 412 for downmixing the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and a decoding unit 414 for decoding the encoded audio signal using the downscaled 3D decode matrix $\tilde{D}$, wherein a plurality of decoded loudspeaker signals is obtained.

In yet another embodiment, an apparatus for decoding an encoded audio signal in Ambisonics format for L loudspeakers at known positions comprises at least one processor and at least one memory, the memory having stored instructions that when executed on the processor implement an adder unit 410 for adding at least one position of at least one virtual loudspeaker to the positions of the L loudspeakers, a decode matrix generator unit 411 for generating a 3D decode matrix D', wherein the positions $\hat{\Omega}_1, \ldots, \hat{\Omega}_L$ of the L loudspeakers and the at least one virtual position $\hat{\Omega}_{L+1}'$ are used and the 3D decode matrix D' has coefficients for said determined and virtual loudspeaker positions, a matrix downmixing unit 412 for downmixing the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and a decoding unit 414 for decoding the encoded audio signal using the downscaled 3D decode matrix $\tilde{D}$, wherein a plurality of decoded loudspeaker signals is obtained.

In yet another embodiment, a computer readable storage medium has stored thereon executable instructions to cause a computer to perform a method for decoding an encoded audio signal in Ambisonics format for L loudspeakers at known positions, wherein the method comprises steps of adding at least one position of at least one virtual loudspeaker to the positions of the L loudspeakers, generating a 3D decode matrix D', wherein the positions $\hat{\Omega}_1, \ldots, \hat{\Omega}_L$ of the L loudspeakers and the at least one virtual position $\hat{\Omega}_{L+1}'$ are used and the 3D decode matrix D' has coefficients for said determined and virtual loudspeaker positions, downmixing the 3D decode matrix D', wherein the coefficients for the virtual loudspeaker positions are weighted and distributed to coefficients relating to the determined loudspeaker positions, and wherein a downscaled 3D decode matrix $\tilde{D}$ is obtained having coefficients for the determined loudspeaker positions, and decoding the encoded audio signal using the downscaled 3D decode matrix $\tilde{D}$, wherein a plurality of decoded loudspeaker signals is obtained. Further embodiments of computer readable storage media can include any features described above.

It will be understood that the present invention has been described purely by way of example, and modifications of detail can be made without departing from the scope of the invention. For example, although described only with respect to HOA, the invention can also be applied for other soundfield audio formats.

Each feature disclosed in the description and (where appropriate) the claims and drawings may be provided independently or in any appropriate combination. Features may, where appropriate be implemented in hardware, software, or a combination of the two. Reference numerals appearing in the claims are by way of illustration only and shall have no limiting effect on the scope of the claims.

The following references have been cited above.

[1] International Patent Publication No. WO2014/012945A1 (PD120032)

[2] F. Zotter and M. Frank, "All-Round Ambisonic Panning and Decoding", J. Audio Eng. Soc., 2012, Vol. 60, pp. 807-820

The invention claimed is:

1. A method of rendering an Ambisonics audio signal, the method comprising:

adding one or more virtual loudspeaker positions $\hat{\Omega}_{L+1}'$ to a set of L loudspeaker positions to determine a new set of $L_2$ loudspeaker positions;

determining a first decode matrix for the new set of $L_2$ loudspeaker positions;

determining a second decode matrix for the set of L loudspeaker positions, wherein the second decode matrix is determined based on at least one coefficient of the first decode matrix, and wherein the second decode matrix is further based on weighting and distributing at least a coefficient for the one or more virtual loudspeaker positions $\hat{\Omega}_{L+1}'$ based on a weighting factor $$g = \frac{1}{\sqrt{L}};$$

determining a rendering matrix based on a normalization of the second decode matrix, wherein the normalization is based on a frobenius norm; and rendering the Ambisonics audio signal based on the rendering matrix.

2. A non-transitory computer readable storage medium having stored thereon executable instructions to cause a computer to perform the method of claim 1.

3. An apparatus for rendering an Ambisonics audio signal, the apparatus comprising:

a first processor for adding one or more virtual loudspeaker positions $\hat{\Omega}_{L+1}'$ to a set of L loudspeaker positions to determine a new set of $L_2$ loudspeaker positions;

a second processor for determining a first decode matrix for the new set of $L_2$ loudspeaker positions;

a third processor for determining a second decode matrix for the set of L loudspeaker positions, wherein the second decode matrix is determined based on at least one coefficient of the first decode matrix, and wherein the second decode matrix is further based on weighting and distributing at least a coefficient for the one or more virtual loudspeaker positions $\hat{\Omega}_{L+1}'$ based on a weighting factor $$g = \frac{1}{\sqrt{L}};$$

a fourth processor for determining a rendering matrix based on a normalization of the second decode matrix, wherein the normalization is based on a frobenius norm; and a fifth processor for rendering the Ambisonics audio signal based on the rendering matrix.

* * * * *